Figure 1:
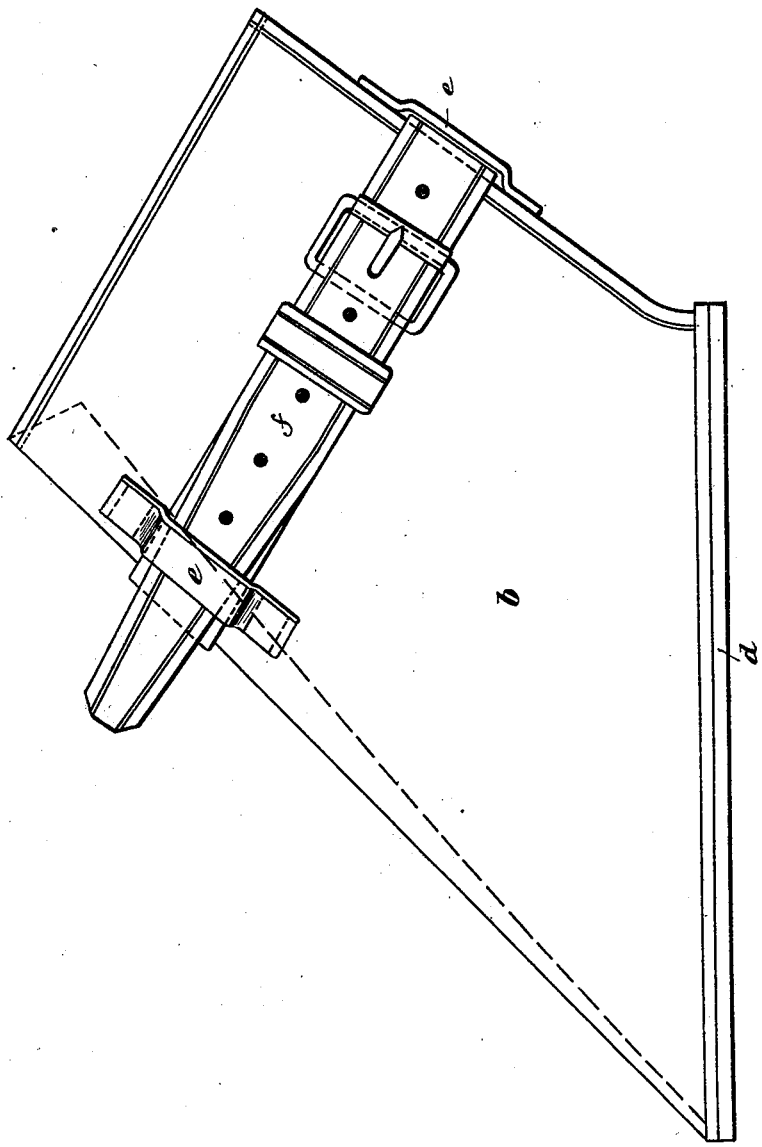

No. 646,842. Patented Apr. 3, 1900.
F. KÖNIG.
PROTECTIVE FOOT COVERING.
(Application filed May 15, 1899.)

(No Model.) 4 Sheets—Sheet 1.

No. 646,842. Patented Apr. 3, 1900.
F. KÖNIG.
PROTECTIVE FOOT COVERING.
(Application filed May 15, 1899.)
(No Model.) 4 Sheets—Sheet 2.

No. 646,842. Patented Apr. 3, 1900.
F. KÖNIG.
PROTECTIVE FOOT COVERING.
(Application filed May 15, 1899.)
(No Model.) 4 Sheets—Sheet 4.

Witnesses
Inventor
Ferdinand König.
per
Attorney.

UNITED STATES PATENT OFFICE.

FERDINAND KÖNIG, OF ELLINGEN, GERMANY.

PROTECTIVE FOOT-COVERING.

SPECIFICATION forming part of Letters Patent No. 646,842, dated April 3, 1900.

Application filed May 15, 1899. Serial No. 716,954. (No model.)

*To all whom it may concern:*

Be it known that I, FERDINAND KÖNIG, agricultural expert, a subject of the Emperor of Germany, residing at Ellingen, Middle Franconia, in the Empire of Germany, have invented certain new and useful Improvements in Protective Foot-Coverings for Cattle for Curing Foot-Rot and other Diseases of the Hoof, of which the following is a specification.

The great losses caused by the foot and mouth disease are due to the difficulty of healing the diseased hoofs, more particularly of the hind feet of the animals, which is easily explained, as the disease attacks the whole organism of the animals, and the animal excreta, both solid and liquid, are infected with the germs of the disease. As, however, most grown cattle are kept in stalls and fastened with a neck-chain, the hind feet are constantly in contact with dung and urine in spite of a thick bedding of straw. If the beast has an open wound in the cloven parts of the hoof, as is usually the case in foot-rot, urine and dung penetrate the sores and prevent them healing. Veterinary surgeons unfortunately mostly give surgical treatment frequently too late to the hoofs of infected beasts, which develop into serious illness, and they must then employ expensive bandages, binders, and the like of slight durability, which in a few days are so rapidly worn away that the dung and urine which produce the sores can again penetrate the hoof. As, however, open wounds can only heal if the sore-producers and foreign substances (in this case infected dung and urine) be kept away from the sores and as hitherto no means have existed for effecting this object completely, the arrangement which forms the object of the present invention effectively prevents the deleterious subsidiary sores in the feet and causes them to heal.

According to the present invention a shoe is so constructed that it is suitable for the hoofs of grown cattle of any size and fits well thereon, without interfering with the circulation of the blood, and may also be easily constructed and modified on the same principles for young beasts with hoofs of small dimensions. The shoe may also be employed for covering any sores or wounds which have been treated by a veterinary surgeon with compresses, bandages, or the like, as the shoe may be placed over the latter, thus protecting them and preventing any impurities penetrating the sores, and these advantages apply for cattle.

Figure 2:
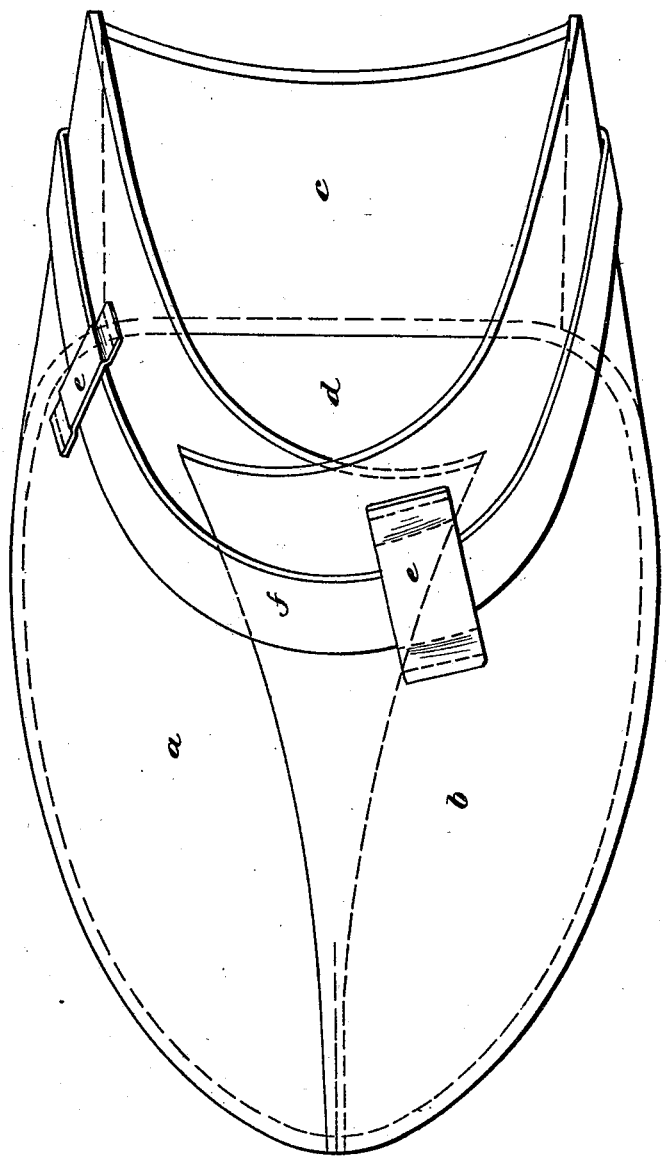
Figure 3:
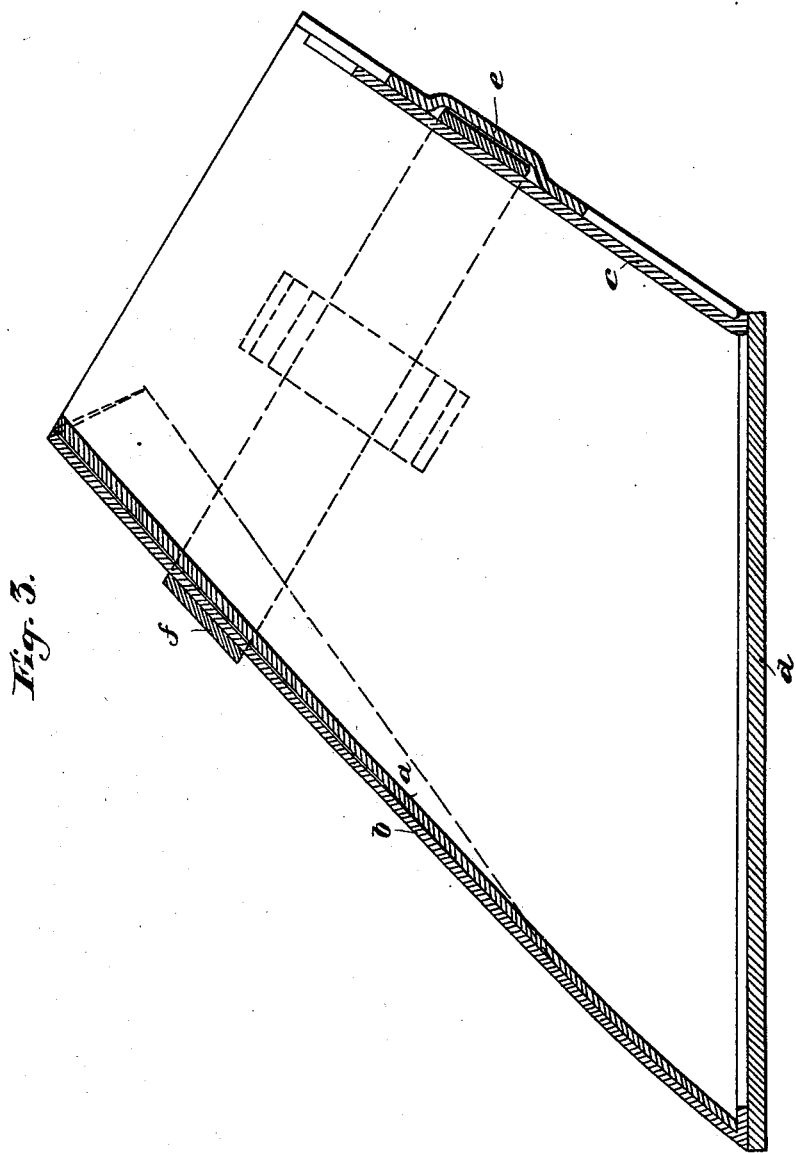
Figure 4:
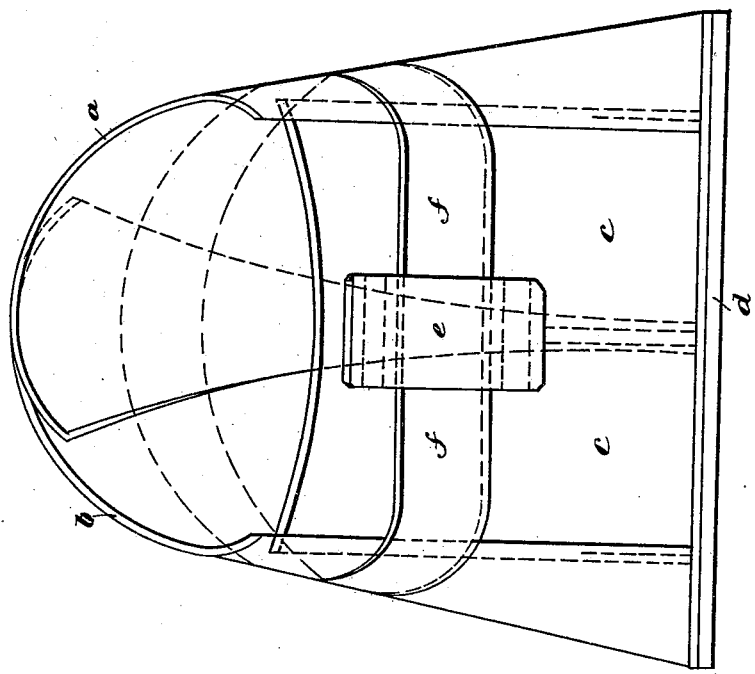

In the accompanying drawings, Figure 1 is a side elevation, and Fig. 2 a plan, of the shoe. Fig. 3 is a vertical section of Fig. 1, and Fig. 4 a rear view.

The shoe consists of an "upper" in two parts $a$ and $b$, a back piece $c$, a sole $d$, a strap and buckle $f$, and loop-pieces $e$, sewed or otherwise suitably attached to the upper portion for holding the strap $f$.

To use the shoe, the strap is unbuckled, the foot of the animal inserted in the shoe, and the strap rebuckled. The shoe may be made of leather.

Having fully described my invention, what I claim, and desire to secure by Letters Patent, is—

A protective foot-covering made of leather or other suitable material for cattle for curing foot-rot and other diseases of the hoof, composed of a sole, an upper made of two parts ($a$ and $b$), the lower edges of which are tightly stitched on said sole, and a back the lower edge of which is also stitched on the sole, the two parts of said upper being so arranged as to overlap each other and said back, so that the covering is adapted to suit any size of hoof and to be tightly closed by any well-known means, and the two parts of the upper being stitched together and to said back over a certain portion of their length, substantially as and for the purpose set forth.

In witness whereof I have hereunto signed my name, this 27th day of April, 1899, in the presence of two subscribing witnesses.

FERDINAND KÖNIG.

Witnesses:
 AUGUST FAIRT,
 OSCAR BOCK.